United States Patent Office 3,199,636
Patented Aug. 10, 1965

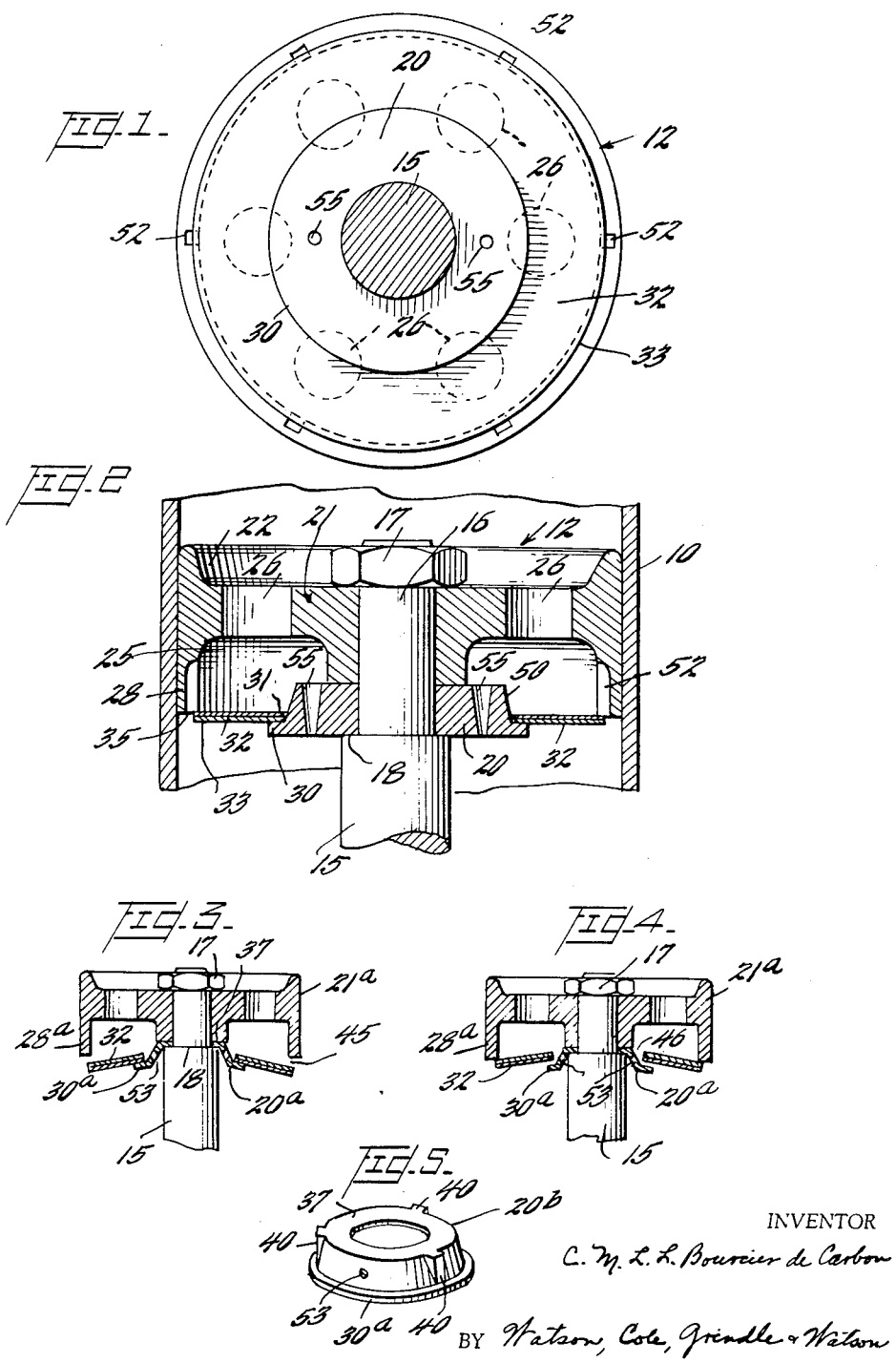

3,199,636
FLOATING VALVES FOR SHOCK ABSORBERS
Christian-Marie-Lucien-Louis Bourcier de Carbon, 64
Blvd. Maurice Barres, Neuilly-sur-Seine, France
Continuation of application Ser. No. 229,386, Oct. 9,
1962. This application Apr. 25, 1963, Ser. No.
275,767
Claims priority, application France, Apr. 26, 1962,
895,729
7 Claims. (Cl. 188—96)

This application is a continuation of my co-pending application Serial No. 229,386, filed October 9, 1962, now forfeited.

This invention relates to shock absorbers and more particularly to shock absorbers of the reciprocating direct-acting, piston-and-cylinder type, and has to do primarily with the piston valving.

The general object of the invention is to provide a novel and improved valve system for shock absorber pistons, in which the control of the flow of the damping fluid is more precise and this without increasing the liability of the valve parts to fatigue and fracture.

Pistons of this general nature are already known, as including a clack valve comprising a thin annular disc or wafer or a packet of such discs, disposed between two seating ledges, the inner circular edge of the annular disc cooperating with one of the seats against which the surface of the disc rests, and the outer peripheral edge of the annular disc cooperating with the other seat against which the opposite face rests. In such pistons a single valve is thus employed for controlling the operation in both directions.

Not only are the discs in this type of valve not subjected to a housing or shrouding effect at any point, but they are not fixed at any point, which justifies the appelation "floating clack valves." Moreover, the small shock effects which manifest themselves at very high frequencies, for example when a vehicle employing the shock absorber is travelling over paving stones, are eliminated, which of course improves the comfort of the ride.

In devices of this type, the action of the annular clack valve is not the same in both directions, the section of the opening affording the passage of the damping liquid being determined not only by the displacement of the clack valve, but also by the diameters, which are not the same in operations in the two directions of movement. It has been found from experience that to achieve a suitable value for the pressure ratios for the two directions of operation, the selection or determination of the two diameters does not by itself permit the obtaining of satisfactory results.

In its preferred embodiments, the invention contemplates the provision of a piston, or other partition or separator, which has an annular cavity in one or the other of its opposite faces, and a plurality of free openings or passageways leading from the bottom of said cavity through the opposite face of the piston.

Thin flexible resilient annular valve discs comprise the only movable valve elements and one or more of these are disposed within the cavity, and fixed circular ledges are formed or otherwise provided on the oppositely facing inner and outer circular walls of the cavity for seating the discs. For purposes of use more particularly in a vehicular suspension shock absorber, the ledge on the inner wall supports the inward margin of the discs against movement outwardly of the cavity and the ledge on the outer wall forms an abutment or seat for the outward margin of the discs and limits its movement inwardly of the cavity.

The present invention therefore relates to improvements in devices of this type and is characterized principally by the fact that at the outlet of the passage or clearance existing between the inside peripheral edge of the clack valve and its support, is disposed an obstacle or throttling means comprising a part forming a projection or jutting-out in relation to the support, on the entire periphery of a portion thereof, so as to increase the resistance of the passage of damping liquid at this part of the valving.

In particular, this jutting or projecting part can be partially or wholly in the form of a surface of revolution and of a diameter progressively decreasing from the valve disc support. For example, the jutting surface can be substantially conical so as to offer to the passage of the liquid a variable and increasingly greater section proportionate to the degree of bending of the valve under the pressure of the liquid.

Other objects and features of novelty, including the provision of a slight pre-tensioning of the discs and of a calibrated conical member disposed axially and concentrically of the discs, will be apparent from the following specification when read in connection with the accompanying drawings in which certain embodiments of the invention are illustrated by way of example.

In the drawings:

FIGURE 1 is a bottom plan view of a piston embodying the principles of the invention;

FIGURE 2 is a view in vertical section of the piston positioned for reciprocation within a cylinder as for example in a shock absorber structure, the valves of the piston being in closed or idle position;

FIGURE 3 is a similar view of a piston to which a modified form of valve seating means is applied; the valve discs being in position to pass fluid downwardly past the outward margin of the discs;

FIGURE 4 is a similar view of the same embodiment with the valves in position to pass fluid upwardly past the inward margins of the discs; and FIGURE 5 is a view in perspective of a valve seating element of a modified construction.

For examples of the type of shock absorbers to which the present invention is particularly applicable, reference is made to a number of prior patents granted to the present applicant, among which may be mentioned my French Patents 1,020,109, 1,073,454, 1,104,016 and 1,185,696, and therefore there need only be illustrated in the present application those portions of the entire installation which embody the novelty of the present invention. Thus, in FIGURE 2 of the drawings, the shock absorber cylinder or casing is only fragmentarily illustrated at 10 and an exemplary piston is indicated generally by the numeral 12. The piston rod 15 has an attenuated terminal portion 16, to the threaded end of which is screwed a retaining nut 17. Against the shoulder 18 formed at the junction of portions 15 and 16 of the piston rod, there is seated an annular supporting piece 20.

Above this member is clamped the main body portion 21 of the piston which has a dished upper surface 22 and a relatively deep annular cavity 25 formed in its under surface. Communication between the cavity 25 and the upper face of the piston is had through the series of vertical passageways 26.

The outer circular wall of the cavity 25 is comprised by the marginal skirt 28 of the piston and the inner wall is comprised in part by the projecting or jutting peripheral edge portion 20A of the supporting element 20.

Supporting element 20 is provided with a ledge 30 upon which rests the radially inward marginal portion 31 of the flexible resilient valve disc element or elements 32. As will be explained, the number of valve discs needed in this particular novel arrangement is reduced over that required in certain similar piston valving arrangements. Two discs are illustrated, for example, in the present drawings and in some cases even a single disc would suffice.

The outer marginal portion 33 of the discs underlies the bottom margin of the skirt 28 which in effect forms a reversed abutment ledge 35. The discs 32 are preferably applied to the ledges 30 and 35 under a very slight initial stress, just enough to ensure that in their position of repose shown in FIGURE 2, they seat against the respective ledges. It is to be particularly noted that this positioning of the valving without any gripping of the margins upon either side, eliminates any rigidly supported cantilever arrangement which has characterized certain prior devices of this type. At the same time the discs are normally held in centered position at the inner edges rather than at the outer edges thereof.

In FIGURES 3 and 4 of the drawings, there is diagrammatically shown a modified form of piston valving, and this illustrated modification is utilized to indicate the two open positions of the valving for flow of fluid in opposite directions. In these embodiments the piston rod 15 carries the piston body 21a and the clamping nut 17, but between the shoulder 18 of the piston rod and the inner central portion of the body 21a there is clamped a frusto-conical seating member 20a which may be economically made of stamped sheet metal, the upper central annular flange 37 serving to clamp the member in position and the lower outwardly projecting annular flange 30a providing the inward ledge for the margins of the discs 32. The outward depending skirt 28a of the piston provides the upward abutment for the valving as in the device shown in FIGURE 2 of the drawings.

If it is found to be necessary or advisable, particularly in the use of multiple discs, the frusto-conical inward seating member may be formed as illustrated in FIGURE 5 of the drawings, the element itself being designated 20b and provided with the flanges 37 and 30a as in the earlier described embodiment, but also provided with the vertically faced bosses or spurs 40 which ensure the centering of the discs of the stack. However, it should be pointed out that in most cases these centering spurs are not absolutely necessary; as a matter of fact, rather remarkably, when there is an initial pre-stress applied to the discs, they seem to have a tendency to remain centered and even to center themselves automatically under the effect of the deformations and sliding contacts which accompany their operation.

In operation, during compression movement of the piston, that is to say, upwardly as viewed in FIGURES 2, 3 and 4, the pressure of fluid above the discs 32 serves to flex the discs downwardly at their outer margins and permit an escape of fluid through the resulting annular passageway 45 between the lower edge of the skirt 28 or 28a as illustrated in FIGURE 3.

On the other hand, during expansion movement (or rebound movement in the case of a vehicular shock absorber) the pressure of fluid beneath the piston sets upon the stocks of discs to flex their inner margins 31 upwardly away from the seat 30 or 30a and provide an annular passageway 46 for upward flow or fluid. Thus, there is provided essentially a shock absorber piston, the operation of which in both directions is provided by a single valve.

The most outstanding feature of this type of valve resides in the fact that not only is each of the valve discs not subject at any of its pivot or fulcrum points to a rigidly clamped fixed-end effect, but the disc is completely mobile at all points. If the conditions of the valve discs in FIGURES 3 and 4 are compared, it is seen that between the compression movement and the expansion movement, the conically deformed stack of flap valve discs need never to undergo a reversal of curvature but is subjected substantially to a translatory movement, which justifies the application of the designation "floating flap valve."

Also, for many reasons, the adjustment of vehicle suspension shock absorbers is generally established with a co-efficient of braking during the expansion or rebound movement which is greater than that of the braking during compression. One of the main advantages of this new piston is that it automatically and inherently provides an absolutely specific ratio between the expansion and the compression braking when the angle of the conical surface 50 of the projecting portion 20A of the support member 20 has been properly predetermined. This feature has the important advantage of simplicity of manufacture and inspection. By varying the angle of the surface 50 one can, without modifying the compression characteristics, stiffen the expansion characteristics as much as desired and thus retain positive control of the expansion stroke compression ratio. It will also be clearly understood that due to the inclination of the frusto-conical surface 50, progressive flexing of the discs results in a small initial volume of liquid but which increases as the bending of the discs increases.

Furthermore, the characteristics of the expansion and compression factors obtained with such a piston prove to be remarkably linear which is in general an excellent property for a vehicle suspension shock absorber. However, it is to be noted that the shape of the expansion curve can be varied as desired by substituting for the conical surface 50 a surface of revolution having a curved or linear generatrix of suitable profile.

It will thus be understood that the portion of the member 20 above the normal level of the valve discs 32 and represented by the surface 50, constitutes an obstruction to the free and uninhibited flow of fluid once it has passed the orifice afforded by the flexing of the inner margin of the valve discs. In certain prior developments of this general character the nature of the opening between the flexing inner margins of the valve disc was such that the fluid was immediately unconfined and not affording any substantial resistance to the flow of the fluid once it has passed the lip or margin of the valve disc. In the present case, the surface 50 affords a graduated throttling or restriction to flow in contrast with such prior developments, but at the same time gradually reducing such resistance according to a linear law.

The initial slight stressing of the discs, already mentioned, may be determined by a small difference in level of the lower end of the skirt portion 28 and the upper face of the ledge 30, which should be less than the thickness of the stack of discs. For instance, in a typical shock absorber installation this distance could be in the neighborhood of two-tenths of a millimeter.

The principal operation described above can be supplemented by providing one or more permanent passageways through the piston for the transmission of fluid during a smooth boulevard ride, when the damping properties of the shock absorber need not be brought into severe action. In FIGURE 2 it is indicated that these passageways may take the form of small notches cut in the inner face of the outer wall of the cavity 25, that is to say, in the skirt portion 28. These notches are indicated at 52 in the drawings. Similar notches could be cut in the top surface of the ledge 30 or through the conical portion of the sheet metal member 20a as indicated at 53 in FIGURES 3, 4 and 5 of the drawings.

Such permanent passageways can also furnish the following novel property which has technical advantages; they can be made in a generally conical or similar shape so as to impart to them also a differential resistance effect, for instance greater in expansion than in compression. The preferred embodiment will in this case be in the form of the conical passageways 55 provided in the supporting member 20 as shown in FIGURE 2.

It is understood that various changes and modifications may be made in the embodiments illustrated and described herein without departing from the scope of the invention as determined by the following claims.

Having thus described the invention, what is claimed as new and desired to be secured by Letters Patent is:

1. In a direct-acting piston-and-cylinder shock absorber, a cylinder containing damping fluid, a piston disposed for reciprocation therein, means for by-passing damping fluid through the piston from one side to the other, said means including an annular cavity formed in said piston and having inner and outer circular walls, at least one thin annular resilient valve disc positioned within said cavity, a fixed annular seat on one wall of said cavity facing in one axial direction and a fixed annular seat on the other of said walls facing in the opposite axial direction, the outer marginal portion of said disc normally seated in the axial direction against the seat on the outer one of said walls, and the inner marginal portion of said disc seated against the seat on the inner one of said walls, whereby movement of said piston in one direction causes pressure of damping fluid against the valve disc in the opposite direction and causes the disc to yieldably flex away from one of said seats and afford an annular opening between the adjacent portions of the disc and the seat for the controlled passage of fluid therethrough, characterized by the provision of an obstruction to flow of fluid comprising a part projecting from at least a portion of the periphery of the support so as to throttle the flow of damping fluid past this inner portion of the valve disc, and the obstruction so constructed and arranged as to gradually decrease the throttling effect as the flexing of the disc increases.

2. The shock absorber as set forth in claim 1 in which the internal diameter of the valve disc is substantially the same as the larger diameter of the sloping projecting part at the point nearest the seat whereby the annular valve disc is centered at this point when closed.

3. The device as set forth in claim 1 in which there are disposed projecting ribs of substantially uniform diameter extending radially outwardly from the inclined surface of the projecting part so as to maintain the centering of the valve disc in all positions of operation.

4. In a direct-acting piston-and-cylinder shock absorber, a cylinder containing damping fluid, a piston disposed for reciprocation therein, means for by-passing damping fluid through the piston from one side to the other, said means including an annular cavity formed in said piston and having inner and outer circular walls, at least one thin annular resilient valve disc positioned within said cavity, a fixed annular shoulder on one wall of said cavity facing in one axial direction and a fixed annular shoulder on the other of said walls facing in the opposite axial direction, the outer marginal portion of said disc normally seated in the axial direction against the shoulder on the outer one of said walls and being unconfined laterally at this point, and the inner marginal portion of said disc seated against the shoulder on the inner one of said walls, whereby movement of said piston in one direction causes pressure of damping fluid against the valve disc in the opposite direction and causes the disc to yieldably flex away from one of said shoulders and afford an annular opening between the adjacent portions of the disc and the shoulder for the controlled passage of fluid therethrough, the outer shoulder and the outer portion of the disc being the ones involved in passing the fluid during the compression stroke of the piston and the inner shoulder and inner portion of the disc being the ones involved during the extension or rebound stroke, and the discs comprising the only movable valve elements carried by said piston, one of said circular walls being cut away adjacent the co-operating edge portion of the disc to afford an opening of variable section as the adjacent edge portion of said disc is flexed.

5. The shock absorber as set forth in claim 4 in which the said inner wall is tapered in that it has a radially outwardly facing surface in the form of a surface of revolution of a diameter progressively decreasing from the level of the valve disc seating shoulder, so as to offer to the passage of liquid a variable and increasing greater section depending on the degree of flexing of the disc.

6. The shock absorber as set forth in claim 4 in which said inner wall of the cavity is frusto-conical.

7. The shock absorber as set forth in claim 6 in which the annular element is of sheet metal and the intermediate portion thereof is of frusto-conical configuration.

References Cited by the Examiner

UNITED STATES PATENTS 2,670,814   3/54   Ball _____ 188—88

FOREIGN PATENTS 969,330   5/58   Germany.
1,065,526   1/54   France.

ARTHUR L. LA POINT, *Primary Examiner.*

EUGENE G. BOTZ, *Examiner.*